(12) United States Patent
Dashiell et al.

(10) Patent No.: US 10,158,784 B2
(45) Date of Patent: Dec. 18, 2018

(54) SYSTEM AND METHOD FOR ADAPTIVELY COMPRESSING DATA HAVING NOISY IMAGES USING LOSSLESS COMPRESSION

(71) Applicant: Xerox Corporation, Norwalk, CT (US)

(72) Inventors: Stephen R. Dashiell, Pasadena, CA (US); David E. Rumph, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 17 days.

(21) Appl. No.: 15/371,278

(22) Filed: Dec. 7, 2016

(65) Prior Publication Data

US 2018/0160013 A1 Jun. 7, 2018

(51) Int. Cl.
*H04N 1/41* (2006.01)
*H04N 1/413* (2006.01)
*H04N 1/32* (2006.01)

(52) U.S. Cl.
CPC ......... *H04N 1/413* (2013.01); *H04N 1/32277* (2013.01); *H04N 1/32309* (2013.01); *H04N 2201/0094* (2013.01); *H04N 2201/325* (2013.01); *H04N 2201/3242* (2013.01); *H04N 2201/3243* (2013.01); *H04N 2201/3252* (2013.01); *H04N 2201/3259* (2013.01)

(58) Field of Classification Search
CPC .... H04N 1/413; H04N 19/10; H04N 1/32277; H03M 7/3051
See application file for complete search history.

(56) References Cited

U.S. PATENT DOCUMENTS

| 4,149,194 | A | | 4/1979 | Holladay |
| 5,479,263 | A | | 12/1995 | Jacobs et al. |
| 5,499,373 | A | * | 3/1996 | Richards ............. G06F 17/5009 386/E5.016 |
| 5,659,634 | A | | 8/1997 | Yeh et al. |
| 5,867,599 | A | | 2/1999 | Michaelis et al. |
| 5,949,966 | A | | 9/1999 | Hayashi |
| 6,006,013 | A | | 12/1999 | Rumph et al. |
| 6,020,979 | A | | 2/2000 | Zeck et al. |
| 6,272,255 | B2 | | 8/2001 | de Queiroz et al. |
| 6,793,309 | B2 | | 9/2004 | McCay et al. |
| 6,873,737 | B2 | | 3/2005 | Yokose |
| 6,968,090 | B2 | | 11/2005 | Yokose |
| 7,190,837 | B2 | | 3/2007 | Li et al. |

(Continued)

*Primary Examiner* — King Poon
*Assistant Examiner* — Michael Burleson
(74) *Attorney, Agent, or Firm* — Michael J. Nickerson; Basch & Nickerson LLP (57) ABSTRACT

A system and method adaptively lossy compresses image data by receiving a pixel of image data and meta data indicating a type of object that generated the pixel of image data, the pixel of image data includes a first byte having most significant bits of image data and a second byte having least significant bits of image data; electronically determining if the meta data associated with the pixel of image data is associated with a noisy image or indicates that the pixel of image data was generated by a specific type of object; electronically modifying the pixel of image data, when it is determined that the meta data is associated with the pixel of image data is associated with a noisy image or indicates that the pixel of image data was generated by a specific type of object, by setting a predetermined number of low bits of the pixel of image data to zero.

7 Claims, 4 Drawing Sheets

(56) References Cited

U.S. PATENT DOCUMENTS

| | | |
|---|---|---|
| 7,302,097 B2 | 11/2007 | Bai et al. |
| 7,343,046 B2 | 3/2008 | Curry et al. |
| 7,414,757 B2 | 8/2008 | Eldridge et al. |
| 7,539,341 B2 | 5/2009 | Eschbach et al. |
| 7,889,926 B2 | 2/2011 | Kimura et al. |
| 7,920,293 B2 | 4/2011 | McElvain et al. |
| 8,345,999 B2 | 1/2013 | Bai et al. |
| 8,437,043 B2 | 5/2013 | Ebner et al. |
| 8,593,691 B2 | 11/2013 | Triplett et al. |
| 9,014,255 B2 | 4/2015 | Schweid et al. |
| 9,015,429 B2 | 4/2015 | Li |
| 9,058,638 B2 | 6/2015 | Blurfrushan et al. |
| 9,066,112 B2 | 6/2015 | Lin et al. |
| 9,123,087 B2 | 9/2015 | Das |
| 9,165,268 B2 | 10/2015 | Davies |
| 2003/0090709 A1* | 5/2003 | Rijavec ............... H03M 7/3088 358/1.15 |
| 2007/0236736 A1 | 10/2007 | Tai et al. |
| 2007/0252838 A1 | 11/2007 | Hains et al. |
| 2015/0016735 A1* | 1/2015 | Kikuchi .................. G06T 9/00 382/232 |

* cited by examiner

SYSTEM AND METHOD FOR ADAPTIVELY COMPRESSING DATA HAVING NOISY IMAGES USING LOSSLESS COMPRESSION

BACKGROUND

Documents having image data at high resolutions require very large amounts of storage space. Such documents having image data at high resolutions are typically subjected to some form of data compression in order to avoid the high costs that would be associated with storing the documents.

Such image data, when derived from natural sources such as digital camera or scanners, contain random noise due to the capture process. Synthetically generated image data typically do not contain such noise.

"Lossless" compression methods, such as Lempel-Ziv Welch (LZW), do not perform particularly well on portions of a document that contain noisy pixel maps (continuous-tone pixel maps with inherent random noise or noisy images).

On the other hand, "lossy" methods such as JPEG work fairly well on continuous-tone pixel maps with inherent random noise (noisy images), but the "lossy" methods do not work particularly well on the parts of the document that contain text.

Figure 1:
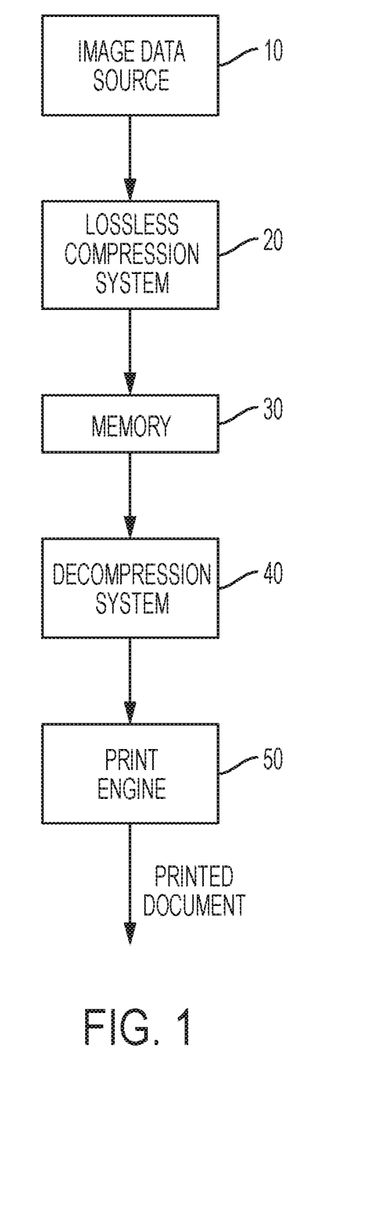
FIG. 1 is a block diagram showing a conventional image data path for rendering image data.

As illustrated in FIG. 1, a conventional image data path for rendering image data includes an image data source 10. As noted above, image data is subjected to data compression to reduce memory requirements for the image data.

The image data from the image data source 10 is lossless compressed by a lossless compression system 20 prior to being stored in a memory 30. When image data is to be rendered by a print engine 50, the compressed image data is read from the memory 30 and then decompressed by a decompression system 40.

The decompressed image data is transmitted to the print engine 50, wherein the print engine 50 converts the decompressed image data to a printed image on a recording medium.

However, as noted above, since the conventional compression/decompression system of FIG. 1 uses a single compression method, lossy or lossless, the conventional compression/decompression system fails to effectively compress noisy image data, such as continuous-tone pixel maps, if the conventional compression method is lossless or fails to preserve image quality on text if the conventional compression method is lossy.

Thus, it is desirable that an adaptive compression/decompression system which can effectively losslessly compress noisy image data, while still producing good results for text.

BRIEF DESCRIPTION OF THE DRAWING

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

The term "data" refers herein to physical signals that indicate or include information. An "image," as a pattern of physical light or a collection of data representing said physical light, may include image data, characters, words, and text as well as other features such as graphics.

A "digital image" is by extension an image represented by a collection of digital data. An image may be divided into "segments," each of which is itself an image. A segment of an image may be of any size up to and including the whole image.

The term "image object" or "object" as used herein is generally equivalent to the term "segment" and will be employed herein interchangeably.

In a digital image composed of data representing physical light, each element of the data is called a "pixel," which is common usage in the art and refers to a picture element.

Each pixel has a location and value. Each pixel value has a bit depth. In a "binary form," the bit depth of a pixel is a single bit. In a gray scale or color image situation, the bit depth of a pixel is multiple bits.

An operation performs "image processing" when it operates on an item of data that relates to part of an image.

"Contrast" is used to denote the visual difference between items, data points, and the like. It can be measured as a color difference or as a luminance difference or both.

A digital color printing system is an apparatus arrangement suited to accepting image data and rendering that image data upon a substrate.

The word "printer" and the terms "printing system" or "print engine" as used herein encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a marking engine and which may perform a print outputting function for any purpose.

Figure 2:
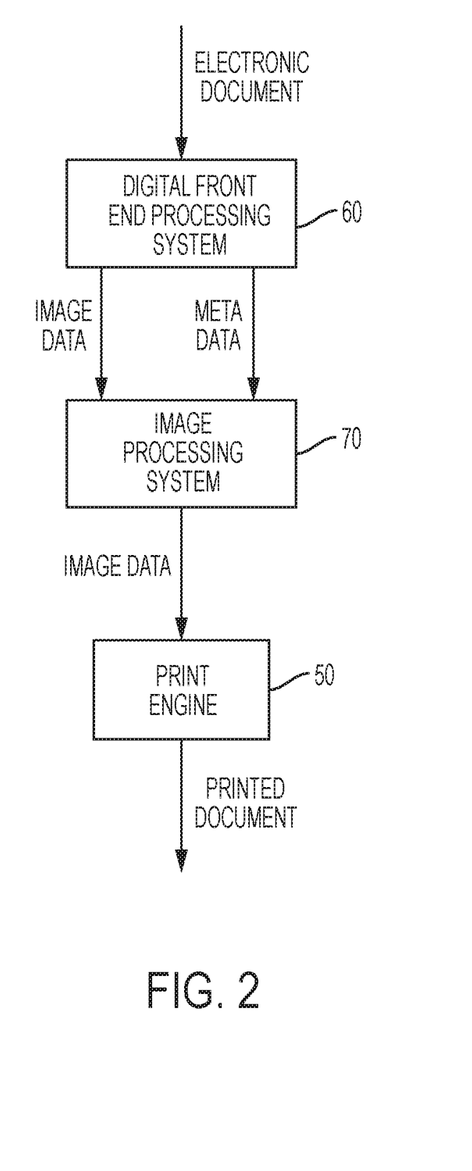
FIG. 2 is a block diagram showing an electronic document data path for rendering a document.

With reference to FIG. 2, an electronic document data path for rendering a document includes a digital front end processing system 60, which receives an electronic document and "decomposes" the electronic document into image data and meta data. The meta data may include information indicating the type of object that generated the pixel of the image data.

It is noted that the digital front end processing system 60 may also "decompose" the electronic document into tag data, along with the image data and the meta data. If the digital front end processing system 60 "decomposes" the electronic document into tag data, the tag data may include information as to the classification of the image data or instructions with respect to the processing of the image data.

An image processing system 70 receives the image data and meta data. The image processing system 70 processes the image data and the meta data and generates processed image data which is transmitted to print engine 50 for final processing and rendering as an image on a recording substrate.

If the image processing system 70 receives tag data, the image processing system 70 may process the image data in accordance with the tag data.

If the image processing system 70 receives tag data, the image processing system 70 may transmit tag data to the print engine 50, which can be utilized by the print engine 50 during the final processing and rendering.

It is noted that the image processing system may store the image data (or, alternatively, the image data and that tag data) prior to transmitting the data to the print engine 50.

Figure 3:
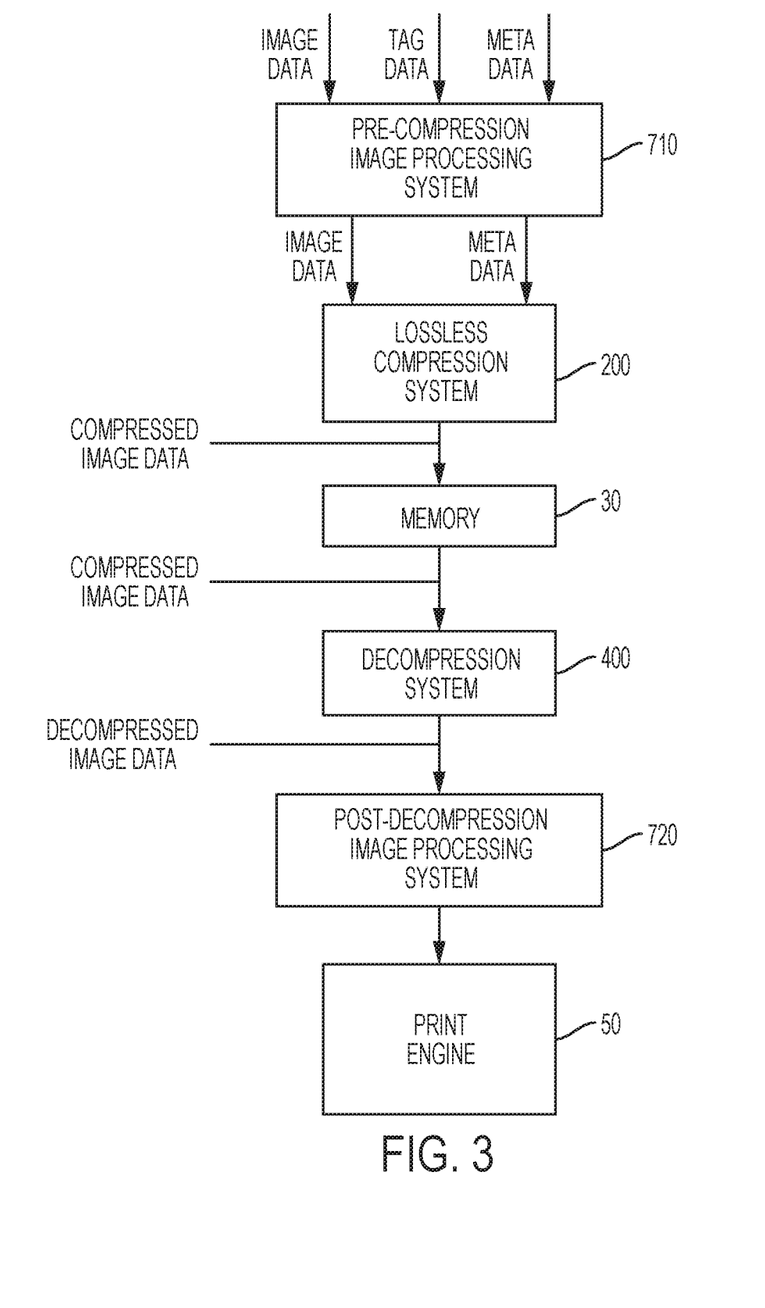
FIG. 3 is a block diagram of a lossless compression/decompression system.

To facilitate the storing function, FIG. 3 illustrates the utilization of compression and decompression to reduce the memory requirements of the system.

As illustrated in FIG. 3, image data and meta data, from a digital front end processing system, is received by a pre-compression image processing system 710, which processes the image data and the meta data and generates processed image data which is transmitted, along with the meta data, to a lossless compression system 200.

If the pre-compression image processing system 710 receives tag data, the pre-compression image processing system 710 may process the image data in accordance with the tag data, and the pre-compression image processing system 710 may transmit the tag data to the lossless compression system 200.

The lossless compression system 200 losslessly compresses the processed image data. The lossless compression process will be explained in more detail below with respect to FIGS. 4, 5, and 6.

If the lossless compression system 200 receives tag data, the lossless compression system 200 losslessly compresses the tag data.

The lossless compression system 200 transmits the compressed image data (or, alternatively, the compressed image data and the compressed tag data) to memory 30 for storing.

When needed, the compressed image data (or, alternatively, the compressed image data and the compressed tag data) are read from the memory 30 and transmitted to a decompression system 400, wherein the compressed image data (or, alternatively, the compressed image data and the compressed tag data) are decompressed using a decompression method associated with the lossless compression method used by the lossless compression system 200.

The decompressed image data (or, alternatively, the decompressed image data and the decompressed tag data) are transmitted to a post-decompression image processing system 720 for final processing of the image data before the image data is rendered by the print engine 50. The decompression system 400 transmits the processed image data (or, alternatively, the decompressed image data and tag data) to the print engine 50.

Figure 4:
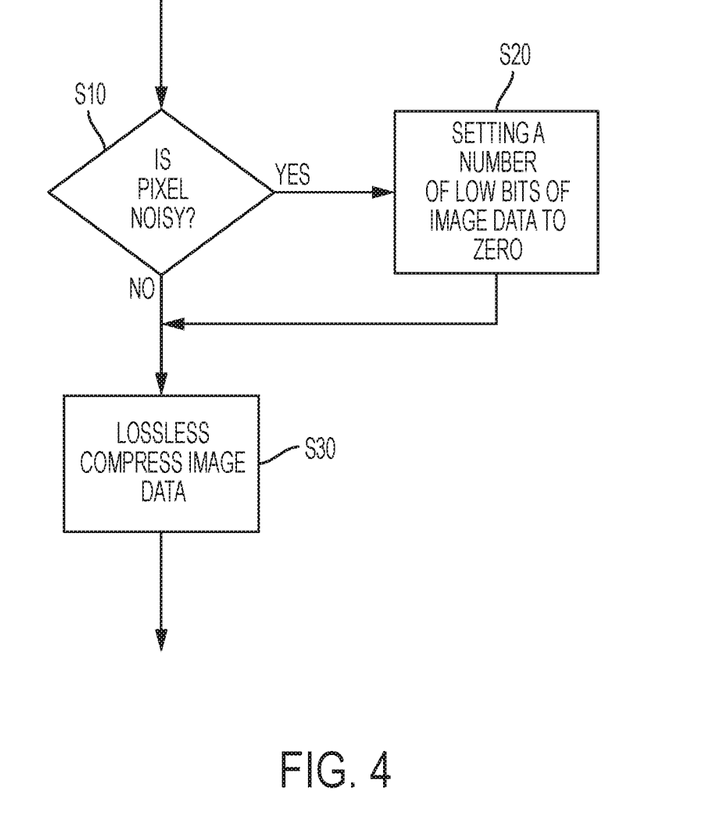
FIG. 4 is a flowchart of an adaptive lossless compression method.

FIG. 4 illustrates a flowchart showing the lossless compression process utilized by the lossless compression system 200 of FIG. 3.

As illustrated in FIG. 4, at step S10, the lossless compression system determines if the meta data associated with the pixel of image data indicates a noisy image.

In addition, at step S10, the lossless compression system may determine if the meta data associated with the pixel of image data indicates that the pixel of image data was generated by a specific type of object. For example, at step S10, the lossless compression system may determine if the meta data associated with the pixel of image data indicates that the pixel of image data was generated by a specific type of object, wherein the specific type of object is a lossy image object.

If it is determined, at step S10, that the meta data associated with the pixel of image data indicates a noisy image or the meta data associated with the pixel of image data indicates that the pixel of image data was generated by a specific type of object, such as a lossy image object, a number of lower bits of the pixel of image data are set to zero, at step S20.

The modified pixel of image data of step S20 is lossless compressed, at step S30, using a conventional lossless compression process.

If it is determined, at step S20, that the meta data associated with the pixel of image data does not indicate a noisy image, the pixel of image data is lossless compressed, at step S30, using a conventional lossless compression process.

In other words, if it is determined, at step S20, that the meta data associated with the pixel of image data does not indicate a noisy image, the pixel of image data bypasses the modification process of step S20 and is directly compressed by a conventional lossless compression process.

It is noted that if the system is handling tag data, the tag data may also be compressed, at step S30, using a conventional lossless compression process.

It is noted that this modification of the pixel of image data, at step S20, is a lossy step in the lossless compression process.

It is further noted that the modification of the pixel of image data accommodates super resolution encoded pixels because super resolution encoded pixels will be tagged differently than noisy image pixels and will not be modified.

Thereafter, modified image data is compressed using a lossless compression mechanism such as an LZW compression mechanism, or LZA, a Xerox-proprietary lossless compression mechanism.

It is noted that any lossless compression mechanism with compression characteristics suitable for image data can be utilized.

It is further noted that the compressed data is a compressed representation of the page of image data, wherein the pixels are two bytes in size, one byte (most significant byte) having the most significant bits of the pixel of image data and the other byte (least significant byte) having the least significant bits of the pixel of image data, the least significant bits of the least significant byte of each pixel of image data having been set to zero.

It is additionally noted that the tag data may contain information required by the print engine, thus, it is not modified by the adaptive lossless compression process.

It is further noted that the compression method used for tag data does not need to be the same as that used for the image data.

It is noted that the metadata does not need to be retained after compression has been performed.

With respect to decompression, the compressed data is received by the decompression system 400 of FIG. 3. The image data input received by the decompression system 400 of FIG. 3 is in the form of compressed pixels.

In an alternative embodiment, if it is determined, at step S10, that the meta data associated with the pixel of image data indicates a noisy image, the most significant byte of the pixel of image data is retained, at step S20, and the bits of the least significant byte of the pixel of image data are set to zero.

Figure 5:
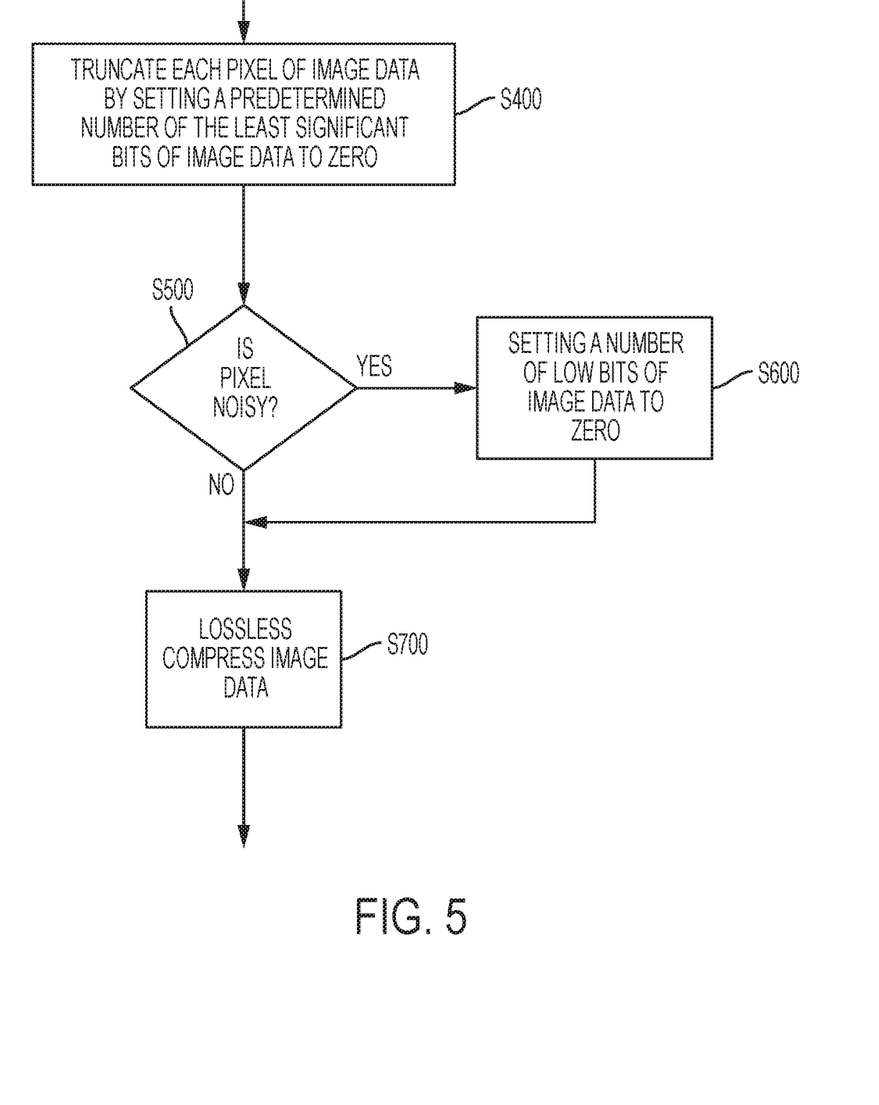
FIG. 5 is a flowchart of another embodiment of an adaptive lossless compression method.

FIG. 5 illustrates a flowchart showing another embodiment of a lossless compression process, which may be utilized by the lossless compression system 200 of FIG. 3.

As illustrated in FIG. 5, at step S400, each pixel of image data is truncated by setting a predetermined number of the least significant bits of the pixel of image data to zero. More specifically, each pixel of image data is truncated such that the number of bits (non-set bits) which are not set to zero is equal to at least the bit depth that is required by the print engine.

For example, if the pixel of image data has a bit depth of sixteen (16) bits/pixel and the print engine has a bit depth requirement of ten (10) bits/pixel, at step S400, each pixel of image data is truncated by setting the six (6) lowest bits of the pixel of image data to zero.

After the pixel of image data is truncated, at step S400, the lossless compression system determines, at step S500, if the meta data associated with the truncated pixel of image data indicates a noisy image.

In addition, at step S500, the lossless compression system may determine if the meta data associated with the pixel of image data indicates that the pixel of image data was generated by a specific type of object. For example, at step S500, the lossless compression system may determine if the meta data associated with the pixel of image data indicates that the pixel of image data was generated by a specific type of object, wherein the specific type of object is a lossy image object.

If it is determined, at step S500, that the meta data associated with the truncated pixel of image data indicates a noisy image or the meta data associated with the pixel of image data indicates that the pixel of image data was generated by a specific type of object, such as a lossy image object, an additional number of lower bits of the pixel of image data are set to zero beyond those truncated in step S400, at step S600.

The modified truncated pixel of image data is lossless compressed, at step S700, using a conventional lossless compression process.

If it is determined, at step S500, that the meta data associated with the truncated pixel of image data does not indicate a noisy image or the meta data associated with the pixel of image data indicates that the pixel of image data was not generated by a specific type of object, such as a lossy image object, the truncated pixel of image data is lossless compressed, at step S700, using a conventional lossless compression process.

In other words, if it is determined, at step S700, that the meta data associated with the truncated pixel of image data does not indicate a noisy image, the truncated pixel of image data bypasses the modification process of step S600 and is directly compressed by a conventional lossless compression process.

It is noted that if the system is handling tag data, the tag data may also be compressed, at step S700, using a conventional lossless compression process.

As noted above, the digital front end processing system generates two types of data for each pixel: image (video) data representing the page image and metadata which provides information about the type of object that generated the pixel. The digital front end processing system may also generate tag data to be used by the print engine.

As illustrated in FIG. 5, the two types of data (image data and meta data) are received by the lossless compression system 200 of FIG. 3. The image data is to be generated at a bit depth at least equal to what the print engine requires.

To realize a bit depth at least equal to what the print engine requires, the image data is truncated to match the requirements of the print engine by setting a number of the least significant bits to zero.

For example, the digital front end processing system generates two (2) bytes of pixel image data, wherein the two bytes represent a pixel of image data having a bit depth of sixteen (16) bits/pixel. However, the print engine may require a pixel bit depth of ten (10) bits/pixel.

In this example, the lossless compression system 200 of FIG. 3 sets the lowest six (6) bits of the least significant byte of the pixel of image pixel to zero, since these bits cannot be used by the print engine.

Thereafter, if the pixel is identified in the metadata as having originated as a noisy image, the lossless compression system 200 of FIG. 3 further modifies the pixel of image data by retaining only the most significant byte of the pixel of image data and setting the bits in the least significant byte to zero.

It is noted that this modification of the pixel of image data is a lossy step in the compression process.

It is further noted that the modification of the pixel of image data accommodates super resolution encoded pixels because super resolution encoded pixels will be tagged differently than noisy image pixels and will not be modified.

Thereafter, modified image data is compressed using a lossless compression mechanism such as an LZW or LZA compression mechanism.

It is additionally noted that the tag data may contain information required by the print engine, thus, it is not modified by the lossless compression process.

It is noted that the compression method used for tag data does not need to be the same as that used for the image data.

It is noted that the metadata does not need to be retained after compression has been performed.

With respect to decompression, the compressed data is received by the decompression system 400 of FIG. 3. The image data input received by the decompression system 400 of FIG. 3 is in the form of compressed pixels with a bit depth at least equal to the requirements of the print engine.

After decompression, each pixel is truncated to the size actually required by the print engine. Once the image data has been decompressed, the image data is delivered to the print engine.

In an alternative embodiment, if it is determined, at step S500, that the meta data associated with the truncated pixel of image data indicates a noisy image or the meta data associated with the pixel of image data indicates that the pixel of image data was generated by a specific type of object, such as a lossy image object, the most significant byte of the truncated pixel of image data is retained, at step S600, and the bits of the least significant byte of the truncated pixel of image data are set to zero.

In summary, a method for adaptive lossless compression of image data receives a pixel of image data and meta data indicating a type of object that generated the pixel of image data, the pixel of image data comprising a specified number of bits of image data; electronically determines if the meta data associated with the pixel of image data indicates that the pixel of image data was generated by a specific type of object; electronically modifies the pixel of image data, when it is determined that the meta data associated with the pixel of image data indicates that the pixel of image data was generated by the specific type of object, by setting a predetermined number of low bits of the pixel of image data to zero; and losslessly compresses both the unmodified and the modified pixels of image data.

The specific type of object may be a noisy image object.

A method for adaptive lossless compression of noisy image data receives a pixel of image data and meta data indicating a type of object that generated the pixel of image data, the pixel of image data includes a first byte having most significant bits of image data and a second byte having least significant bits of image data; electronically determines if the meta data associated with the pixel of image data is associated with a noisy image; electronically modifies the pixel of image data, when it is determined that the meta data associated with the pixel of image data is associated with a noisy image, by setting a predetermined number of low bits of the pixel of image data to zero; and lossless compresses the modified pixel of image data.

The electronic modifying of the pixel of image data may be realized by retaining the first byte of the pixel of image data and setting all bits of the second byte of the pixel of image data to zero.

The method for adaptive lossless compression of noisy image data may electronically truncate the pixel of image data by setting a number of bits in the second byte of the pixel of image data to zero so that a number of non-set bits in the truncated pixel of image data equal a number of bits usable by a print engine; and electronically modify, when it is determined that the meta data associated with the truncated pixel of image data indicates that the truncated pixel of image data was generated by a specific type of object, the truncated pixel of image data by setting the predetermined number of additional low bits of the pixel of image data to zero.

The method for adaptive lossless compression of noisy image data may losslessly compress, when it is determined that the meta data associated with the pixel of image data is not associated with a noisy image, the pixel of image data.

The method for adaptive lossless compression of noisy image data may compress tag data.

The lossless compression method may be an LZA compression method.

A method for rendering noisy image data using adaptive lossless compression receives a pixel of image data and meta data indicating a type of object that generated the pixel of image data, the pixel of image data includes a first byte having most significant bits of image data and a second byte having least significant bits of image data; electronically truncates the pixel of image data by setting a number of bits in the second byte of the pixel of image data to zero so that a number of non-set bits in the truncated pixel of image data equal a number of bits usable by a print engine; electronically determines if the meta data associated with the truncated pixel of image data is associated with a noisy image; electronically modifies, when it is determined that the meta data associated with the truncated pixel of image data is associated with a noisy image, the truncated pixel of image data by setting a predetermined number of low bits of the pixel of image data to zero; lossless compresses the modified truncated pixel of image data to create compressed image data; lossless compresses, when it is determined that the meta data associated with the truncated pixel of image data is not associated with a noisy image, the truncated pixel of image data to create compressed image data; decompresses the compressed image data to create uncompressed image data; and renders, using the print engine, the uncompressed image data.

The electronic modifying of the truncated pixel of image data may be realized by retaining the first byte of the truncated pixel of image data and setting all bits of the second byte of the truncated pixel of image data to zero.

The lossless compression method may be an LZA compression method.

A system for rendering, using a print engine, noisy image data using adaptive lossless compression includes a lossless compression system to receive a pixel of image data and meta data indicating a type of object that generated the pixel of image data, the pixel of image data includes a first byte having most significant bits of image data and a second byte having least significant bits of image data; the lossless compression system electronically determining if the meta data associated with the truncated pixel of image data is associated with a noisy image; the lossless compression system electronically modifying the pixel of image data, when it is determined that the meta data associated with the pixel of image data is associated with a noisy image, by setting a predetermined number of low bits of the pixel of image data to zero; the lossless compression system lossless compressing the modified pixel of image data to create compressed image data; a decompression system to decompress the compressed image data to create uncompressed image data; and a print engine to render the uncompressed image data in accordance with the tag data.

The lossless compression system may electronically modify the pixel of image data by retaining the first byte of the pixel of image data and sets all bits of the second byte of the pixel of image data to zero.

The lossless compression system may electronically truncate the pixel of image data by setting a number of bits in the second byte of the pixel of image data to zero so that a number of non-set bits in the truncated pixel of image data equal a number of bits usable by a print engine; and the lossless compression system may electronically modify, when it is determined that the meta data associated with the truncated pixel of image data is associated with a noisy image, the truncated pixel of image data by setting the predetermined number of additional low bits of the pixel of image data to zero.

The lossless compression system may compress tag data to create compressed tag data; the decompression system may decompress the compressed tag data to create uncompressed tag data; and the print engine may render the uncompressed image data in accordance with the uncompressed tag data.

The lossless compression method may be an LZA compression method.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for adaptive lossless compression of image data, comprising:
   (a) receiving a pixels of image data and meta data indicating a type of object that generated the pixels of image data, the pixels of image data comprising a specified number of bits of image data;
   (b) electronically determining, for each pixel of image data in the received pixels of image data, if the meta data associated with a pixel of image data indicates that the pixel of image data was generated by a specific type of object;

(c) electronically truncating, for each pixel of image data in the received pixels of image data, a pixel of image data by setting a number of bits least significant bits of the pixel of image data to zero so that a number of non-set bits in the truncated pixel of image data equal a number of bits usable by a print engine to create a truncated pixel of image data;

(d) electronically setting, for each pixel of image data in the received pixels of image data, a predetermined number of additional low bits of the truncated pixel of image data to zero when it is determined that the meta data associated with the pixel of image data indicates that the pixel of image data was generated by the specific type of object to create a modified pixel of image data;

(e) losslessly compressing, using LZA compression, both the truncated and the modified pixels of image data.

2. The method as claimed in claim 1, wherein the specific type of object is a lossy image object.

3. The method as claimed in claim 1, wherein said electronically setting a predetermined number of low bits of a pixel of image data to zero retains the first byte of the pixel of image data and sets all bits of the second byte of the pixel of image data to zero.

4. A method for adaptive lossless compression of image data, comprising:

(a) receiving pixels of image data and meta data indicating a type of object that generated the pixels of image data, the pixels of image data comprising a specified number of bits of image data;

(b) electronically determining, for each pixel of image data in the received pixels of image data, if the meta data associated with a pixel of image data indicates that the pixel of image data was generated by a specific type of object;

(c) electronically truncating, for each pixel of image data in the received pixels of image data, a pixel of image data by setting a number of bits in the second byte of the pixel of image data to zero so that a number of non-set bits in the truncated pixel of image data equal a number of bits usable by a print engine to create a truncated pixel of image data;

(d) electronically retaining the first byte of the truncated pixel of image data and setting all bits of the second byte of the truncated pixel of image data to zero, when it is determined that the meta data associated with the truncated pixel of image data indicates that the truncated pixel of image data was generated by a specific type of object, to create a modified pixel of image data; and (e) losslessly compressing, using LZA compression, both the truncated and the modified pixels of image data.

5. The method as claimed in claim 1, further comprising compressing tag data.

6. A method for rendering image data using adaptive lossless compression, comprising:

(a) receiving pixels of image data and meta data indicating a type of object that generated the pixels of image data, the pixels of image data includes a first byte having most significant bits of image data and a second byte having least significant bits of image data;

(b) electronically truncating, for each pixel of image data in the received pixels of image data, a pixel of image data by setting a number of bits in the second byte of the pixel of image data to zero so that a number of non-set bits in the truncated pixel of image data equal a number of bits usable by a print engine;

(c) electronically determining, for each truncated pixel of image data in the received pixels of image data, if the meta data associated with a truncated pixel of image data is associated with a noisy image;

(d) electronically setting, for each truncated pixel of image data in the received pixels of image data, a predetermined number of low bits of a truncated pixel of image data to zero when it is determined that the meta data associated with the truncated pixel of image data is associated with a noisy image to create a modified truncated pixel of image data;

(e) losslessly compressing, using LZA compression, the modified truncated pixels of image data to create compressed image data;

(f) losslessly compressing, using LZA compression, when it is determined that the meta data associated with a truncated pixel of image data is not associated with a noisy image, the truncated pixel of image data not associated with a noisy image to create compressed image data;

(g) decompressing the compressed image data to create uncompressed image data; and (h) rendering, using the print engine, the uncompressed image data.

7. The method as claimed in claim 6, wherein said electronically setting, for each truncated pixel of image data in the received pixels of image data, a predetermined number of low bits of a truncated pixel of image data to zero retains the first byte of the truncated pixel of image data and sets all bits of the second byte of the truncated pixel of image data to zero.

* * * * *